US009110393B2

(12) United States Patent
Takahashi

(10) Patent No.: US 9,110,393 B2
(45) Date of Patent: Aug. 18, 2015

(54) IMAGE FORMING APPARATUS WITH A DRIVE MECHANISM WHICH USES AN ELECTROMOTIVE FORCE OF A MOTOR TO DRIVE ANOTHER MOTOR

(71) Applicant: KYOCERA Document Solutions Inc., Osaka (JP)

(72) Inventor: Kazuhiro Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/444,568

(22) Filed: Jul. 28, 2014

(65) Prior Publication Data

US 2015/0036157 A1 Feb. 5, 2015

(30) Foreign Application Priority Data

Jul. 31, 2013 (JP) ................................ 2013-159957

(51) Int. Cl.
*G06K 15/00* (2006.01)
*G03G 15/00* (2006.01)
*B41J 11/00* (2006.01)

(52) U.S. Cl.
CPC ............... *G03G 15/00* (2013.01); *B41J 11/006* (2013.01)

(58) Field of Classification Search
CPC ........................................................ G03G 5/00
USPC ......................................... 358/1.1–1.18, 498
See application file for complete search history.

(56) References Cited

U.S. PATENT DOCUMENTS

2003/0170036 A1* 9/2003 Mochizuki et al. ............. 399/16
2010/0061784 A1* 3/2010 Matsushima et al. ......... 399/381
2012/0230723 A1* 9/2012 Ishikuro ........................ 399/110

FOREIGN PATENT DOCUMENTS

JP 2006-262628 A 9/2006
JP 2008-199707 A 8/2008
JP 2010-28972 A 2/2010

* cited by examiner

*Primary Examiner* — Marcellus Augustin
(74) *Attorney, Agent, or Firm* — Stein IP, LLC

(57) ABSTRACT

An image forming apparatus having a first motor for rotating a roller for transporting recording paper includes a second motor supplied with electric power from the same power line as the first motor, a driver circuit connected to the power line and generating driving electric power based on electric power from the power line to feed the driving electric power to the second motor, and a controller controlling, on detecting a jam of the recording paper and an open state of a cabinet cover, the driver circuit such that driving electric power is supplied from the power line to the second motor.

2 Claims, 4 Drawing Sheets

IMAGE FORMING APPARATUS WITH A DRIVE MECHANISM WHICH USES AN ELECTROMOTIVE FORCE OF A MOTOR TO DRIVE ANOTHER MOTOR

CROSS-REFERENCE TO RELATED APPLICATIONS

This application is based upon and claims the benefit of priority from the corresponding Japanese Patent Application No. 2013-159957, filed on Jul. 31, 2013, the entire contents of which are incorporated herein by reference.

BACKGROUND OF THE INVENTION

The present disclosure relates to an image forming apparatus and an image forming method.

A motor control device is known that is provided with a detector which detects an electromotive voltage based on an electromotive force occurring in a motor. An electric appliance is known that is provided with an interlock switch for switching connection so as to feed a back electromotive force occurring in a motor to, of a 24V power source and a 5V power source, the 5V power source and that is further provided with a diode between the interlock switch and the 5V power source so as to pass electric power from the interlock switch to the 5V power source. Another motor control device is known that detects a back electromotive force occurring in a motor with the help of a back electromotive force detecting circuit.

According to the conventional technology mentioned above, either a circuit for detecting electric power occurring in a motor is added, or a device needed to consume electric power is added, in an attempt to suppress electric power occurring in a motor. This, however, requires addition of an extra circuit or device, and thus inconveniently leads to an increase in the number of components.

SUMMARY OF THE INVENTION

According to the present disclosure, an image forming apparatus having a first motor for rotating a roller for transporting recording paper includes a second motor supplied with electric power from the same power line as the first motor, a driver circuit connected to the power line and generating driving electric power based on electric power from the power line to feed the driving electric power to the second motor, and a controller controlling, on detecting a jam of the recording paper and an open state of a cabinet cover, the driver circuit such that driving electric power is supplied from the power line to the second motor.

Further features and advantages of the present disclosure will become apparent from the description of embodiments given below.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Hereinafter, an embodiment of the present disclosure will be described with reference to the accompanying drawings.

Figure 1:
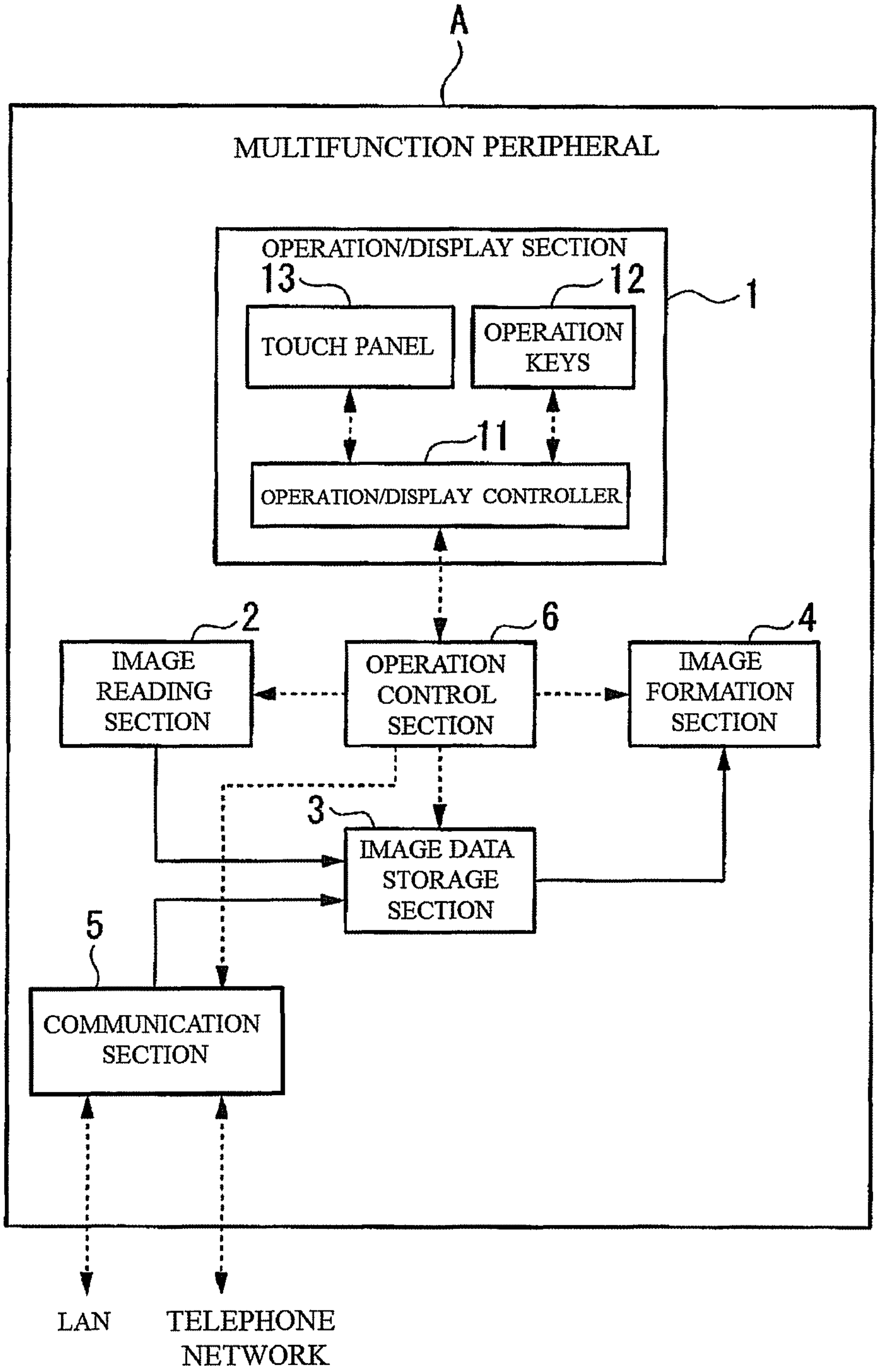
FIG. 1 is a functional block diagram of a multifunction peripheral A according to one embodiment of the present disclosure.

A multifunction peripheral A according to one embodiment of the present disclosure is an image forming apparatus that forms images on recording paper by an electrophotographic process. As shown in FIG. 1, the multifunction peripheral A is provided with an operation/display section 1, an image reading section 2, an image data storage section 3, an image formation section 4, a communication section 5, and an operation control section 6 (controlling means). In FIG. 1, solid-line arrows indicate the flow of image data, and broken-line arrows indicate the flow of control signals and detection signals.

The operation/display section 1 is provided with an operation/display controller 11, operation keys 12 which are hardware keys, and a touch panel 13 which displays software keys and various images. The operation/display section 1 thus functions as a man-machine interface that interfaces between a user and the multifunction peripheral A.

The operation/display controller 11 is a control device which controls the operation keys 12 and the touch panel 13 under the control of the operation control section 6. The operation/display controller 11 is composed of, among others, an operation processor, an internal memory, and an interface circuit for exchanging signals with the operation keys 12 and the touch panel 13 with which it is electrically interconnected. The operation/display controller 11 controls the overall operation of the operation/display section 1 based on an operation/display control program stored in the internal memory.

For example, the operation/display controller 11 feeds a display signal to the touch panel 13 to make the touch panel 13 display operation buttons and various images. Also, the operation/display controller 11 recognizes, based on operation signals fed from the operation keys 12 and the touch panel 13, which of the operation keys 12 or which of the operation buttons displayed on the panel heater 13 is being operated and feeds, based on the results of recognition, operation result signals to the operation control section 6.

The operation keys 12 are physically provided in the form of hardware keys on the operation/display section 1, and include, for example, a power key, a start key, a stop/clear key, and numerical keys (value entry keys). When the user presses any of these keys among the operation keys 12, an operation signal is fed from that key to the operation/display controller 11.

The touch panel 13 has, as well known, a transparent planar pressure sensor of a resistive film type or the like laid on the display surface of a display panel. When any of the operation buttons displayed on the display panel based on a display signal fed from the operation/display controller 11 is pressed by the user's finger or the like, the planar pressure sensor feeds an operation signal indicating the pressed position (pressed coordinates) to the operation/display controller 11.

Figure 2:
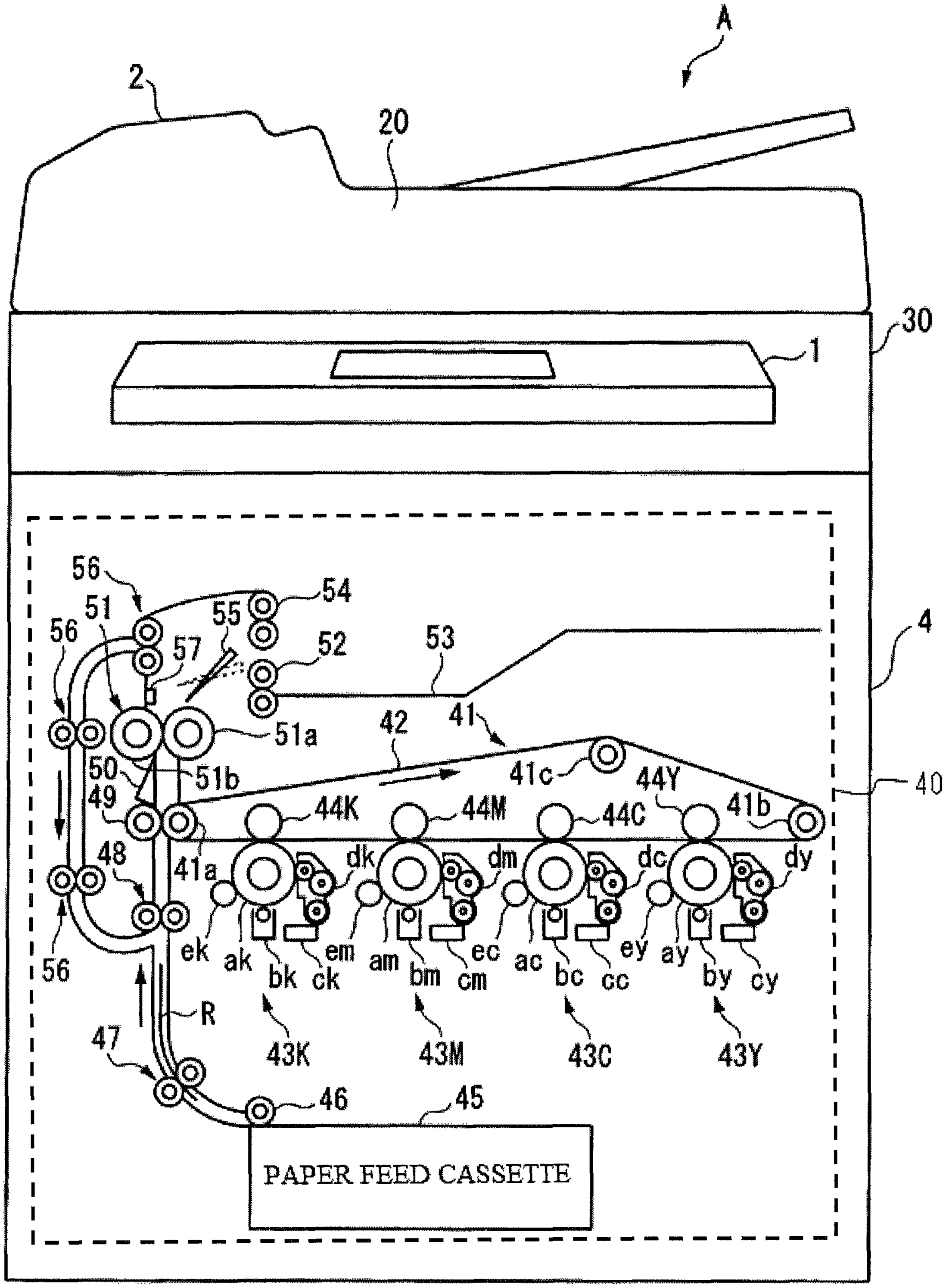
FIG. 2 is a schematic diagram showing a mechanical construction of an image formation section 4 according to one embodiment of the present disclosure.

As shown in FIG. 2, the image reading section 2 is composed of an ADF (automatic document feeder) 20 and a flat-bed reader 30. The image reading section 2 reads, and converts into document image data, a surface image (document image) of a document fed by the ADF 20 according to a control signal fed from the operation control section 6, or of a document placed on the flat-bed reader 30 by the user, and feeds the document image data to the image data storage section 3.

The image data storage section 3 is a semiconductor memory, a hard disk device, or the like. The image data storage section 3 stores, according to a control signal fed from the operation control section 6, the above-mentioned document image data, or print image data received by the communication section 5 from an external client computer, or facsimile image data received by the communication section 5 from an external facsimile machine or the like. The image data storage section 3 also reads such image data according to a control signal fed from the operation control section 6 to feed the image data to the image formation section 4.

The image formation section 4 forms, on recording paper R extracted from a paper feed cassette 45, a toner image based on image data read from the image data storage section 3 according to a control signal from the operation control section 6. As shown in FIG. 2, the image formation section 4 is provided with belt rollers 41, an intermediary transfer belt 42, four image forming units 43Y, 43C, 43M, and 43K corresponding to toner of different colors (Y, C. M, and K), primary transfer rollers 44Y, 44C, 44M, and 44K, a paper feed cassette 45, a pickup roller 46, transfer rollers 47, registration rollers 48, a secondary transfer roller 49, a separator-destaticiser 50, fusing rollers 51, discharge rollers 52, a discharged paper tray 53, reversing rollers 54, a branch guide 55, three pairs of reversed paper transfer rollers 56, and a recording paper sensor 57.

As illustrated, the belt rollers 41 comprise three rollers arranged away from one another, namely a driving roller 41*a*, a driven roller 41*b*, and a tension roller 41*c*. Specifically, the driving roller 41*a* and the driven roller 41*b* are arranged at a predetermined distance from each other in the horizontal direction, and the tension roller 41*c* is arranged between the driving roller 41*a* and the driven roller 41*b*, slightly displaced above these. The intermediary transfer belt 42 is an endless belt wound around the belt rollers 41 (the driving roller 41*a*, the driven roller 41*b*, and the tension roller 41*c*), and is driven by the driving roller 41*a* to move in the direction indicated by an arrow.

Specifically, the intermediary transfer belt 42 moves in the horizontal direction between the driving roller 41*a* and the driven roller 41*b*. The driving roller 41*a* has its shaft coupled to the shaft of a motor which generates a driving force, so that the driving force of the motor causes the intermediary transfer belt 42 to move in the direction indicated by the arrow. The driven roller 41*b* is a free roller which rotates freely, and guides the intermediary transfer belt 42 according to the driving force of the driving roller 41*a*. The tension roller 41*c* is arranged such that its rotary shaft is movable, so that the tension roller 41*c* presses the intermediary transfer belt 42 with a predetermined biasing force to apply a prescribed tension to the intermediary transfer belt 42.

As illustrated, the image forming units 43Y, 43C, 43M, and 43K are arranged at predetermined intervals at the horizontally moving portion of the intermediary transfer belt 42 described above. Of these image forming units 43Y, 43C, 43M, and 43K, the image forming unit 43Y is a unit that forms a yellow (Y) toner image, and is arranged at a position nearest to the driven roller 41*b*. The image forming unit 43C is a unit that forms a cyan (C) toner image, and is arranged at a position next to the image forming unit 43Y to be the second nearest to the driven roller 41*b*. The image forming unit 43M is a unit that forms a magenta (M) toner image, and is arranged at a position next to the image forming unit 43C to be the third nearest to the driven roller 41*b*. The image forming unit 43K is a unit that forms a black (K) toner image, and is arranged at a position nearest to the driving roller 41*a*.

The image forming units 43Y, 43C, 43M, and 43K include, as their respective components, photosensitive drums ay, ac, am, and ak, chargers by, bc, bm, and bk, laser scanning units cy, cc, cm, and ck, developing units dy, dc, dm, and dk, and cleaners ey, ec, em, and ek.

Specifically, the image forming unit 43Y is composed of a photosensitive drum ay, a charger by, a laser scanning unit cy, a developing unit dy, and a cleaner ey. The image forming unit 43C is composed of a photosensitive drum ac, a charger bc, a laser scanning unit cc, a developing unit dc, and a cleaner ec. The image forming unit 43M is composed of a photosensitive drum am, a charger bm, a laser scanning unit cm, a developing unit dm, and a cleaner em. The image forming unit 43K is composed of a photosensitive drum ak, a charger bk, a laser scanning unit ck, a developing unit dk, and a cleaner ek.

The photosensitive drums ay, ac, am, and ak are cylindrical members of which circumferential surfaces are formed of a photosensitive material (for example, amorphous silicon). The chargers by, bc, bm, and bk are for electrically charging the circumferential surfaces (photosensitive surfaces) of the photosensitive drums ay, ac, am, and ak uniformly. The laser scanning units cy, cc, cm, and ck are for irradiating the electrically charged photosensitive surfaces to form electrostatic latent images on them.

The developing units dy, dc, dm, and dk store predetermined amounts of toner (positive-charge toner) inside, and supply the toner to the photosensitive surfaces to develop the electrostatic latent images formed on the photosensitive surfaces into toner images. The cleaners ey, ec, em, and ek are for scraping off and thereby removing the toner (surplus toner) that remains on the photosensitive surfaces after the transfer of the toner images.

As illustrated, four of the primary transfer rollers 44Y, 44C, 44M, and 44K are provided to correspond to the image forming units 43Y, 43C, 43M, and 43K, and are arranged opposite the photosensitive drums ay, ac, am, and ak of the image forming units 43Y, 43C, 43M, and 43K, respectively, across the intermediary transfer belt 42. A negative primary transfer bias (high voltage) is applied to the primary transfer rollers 44Y, 44C, 44M, and 44K, so that by the action of the primary transfer bias, the primary transfer rollers 44Y, 44C, 44M, and 44K transfer the toner images of different colors formed on the photosensitive drums ay, ac, am, and ak of the image forming units 43Y, 43C, 43M, and 43K to the intermediary transfer belt 42 (primary transfer).

The paper feed cassette 45 is a container in which a plurality of sheets of recording paper R of a predetermined shape, such as A4-size or B5-size, are stored in a stacked state. The pickup roller 46 is a roller that is provided at the top of the paper feed cassette 45 in a state pressed against the recording paper R and that picks up the recording paper R inside the paper feed cassette 45 one sheet after another to feed it to the transfer rollers 47. The transfer rollers 47 are rollers that transport the recording paper R fed from the pickup roller 46 further toward the registration rollers 48. The registration rollers 48 are rollers that feed the recording paper R fed from the transfer rollers 47 to the secondary transfer roller 49 with predetermined timing.

The secondary transfer roller 49 is a roller that is arranged opposite the driving roller 41*a* across the intermediary transfer belt 42, and transfers the toner images on the intermediary transfer belt 42 to the recording paper R (secondary transfer). A negative secondary transfer bias (high voltage) is applied to the secondary transfer roller 49, and by the action of the secondary transfer bias, the secondary transfer roller 49 transfers the toner images on the intermediary transfer belt 42 to the recording paper R (secondary transfer).

The separator-destaticiser 50 feeds a positive destaticizing bias toward the recording paper R according to a control signal fed from the operation control section 6. The destaticizing bias is for neutralizing the electrical charge on the recording paper R to bring it into an electrically uncharged state, and thereby facilitates the release of the recording paper R from the secondary transfer roller 49. The separator-destaticiser 50 has a sawtooth-shaped electrode made of stainless steel, and produces an electric field around the tips of the sawtooth-shaped electrode to destaticize the recording paper R.

The fusing rollers 51 are composed of a heating roller 51*a*, which is provided with a heater inside, and a pressing roller 51*b*, which is pressed against the heating roller 51*a*. For the purpose of fusing and fixing the toner images on the transported recording paper R, the heating roller 51*a* and the pressing roller 51*b* of the fusing rollers 51 are pressed against each other at a predetermined fusing pressure (nip pressure) higher than the pressure for the other rollers for transporting the recording paper R. By nipping the recording paper R having the toner images of different colors transferred to it between the heating roller 51*a* and the pressing roller 51*b*, the fusing rollers 51 fix the toner images of different colors on the recording paper R.

The discharge rollers 52 are rollers that transport the recording paper R transported from the fusing rollers 51 and guided through the branch guide 55 toward the discharged paper tray 53. The discharged paper tray 53 is a storage portion where the recording paper R fed from the discharge rollers 52 is stored and held. The reversing rollers 54 are rollers that transport, in a switchback fashion, the recording paper R transported from the fusing rollers 51 and guided through the branch guide 55. That is, the reversing rollers 54 first rotate in a forward direction to nip the recording paper R fed from the fusing rollers 51, and then, with the recording paper R nipped, rotate in a reverse direction to transport it toward the reversed paper transfer rollers 56.

The branch guide 55 switches the transport destination of the recording paper R discharged from the fusing rollers 51 selectively between the discharge rollers 52 and the reversing rollers 54 according to a control signal fed from the operation control section 6. Specifically, when discharging the recording paper R onto the discharged paper tray 53, the branch guide 55 takes a first position (the position indicated by broken lines in the figure) to select the discharge roller 52 as the transport destination of the recording paper R. The branch guide 55 can also take a second position (the position indicated by solid lines in the figure) to switch the transport destination of the recording paper R to the reversing rollers 54.

The reversed paper transfer rollers 56 are rollers that are provided along the transport passage (reversing passage) for transporting the recording paper R fed from the reversing rollers 54 toward the registration rollers 48. As illustrated, the reversed paper transfer rollers 56 are provided at three places away from one another along the reversing passage. The recording paper sensor 57 is arranged between the fusing rollers 51 and the branch guide 55. The recording paper sensor 57 detects the number of sheets of recording paper R that have passed through the fusing rollers 51, and feeds a detection signal indicating the number of sheets to the operation control section 6.

As described above, in the image formation section 4, a two-side image formation operation, whereby toner images are formed on both the obverse and reverse sides of recording paper R, is performed through the functioning of the reversing rollers 54, the branch guide 55, and the reversed paper transfer rollers 56. That is, when recording paper R having undergone image formation on the obverse side passes through the fusing rollers 51, it is then reversed top side down, and in this state, it is fed to the registration rollers 48 once again for image formation on the reverse side.

Figure 3:
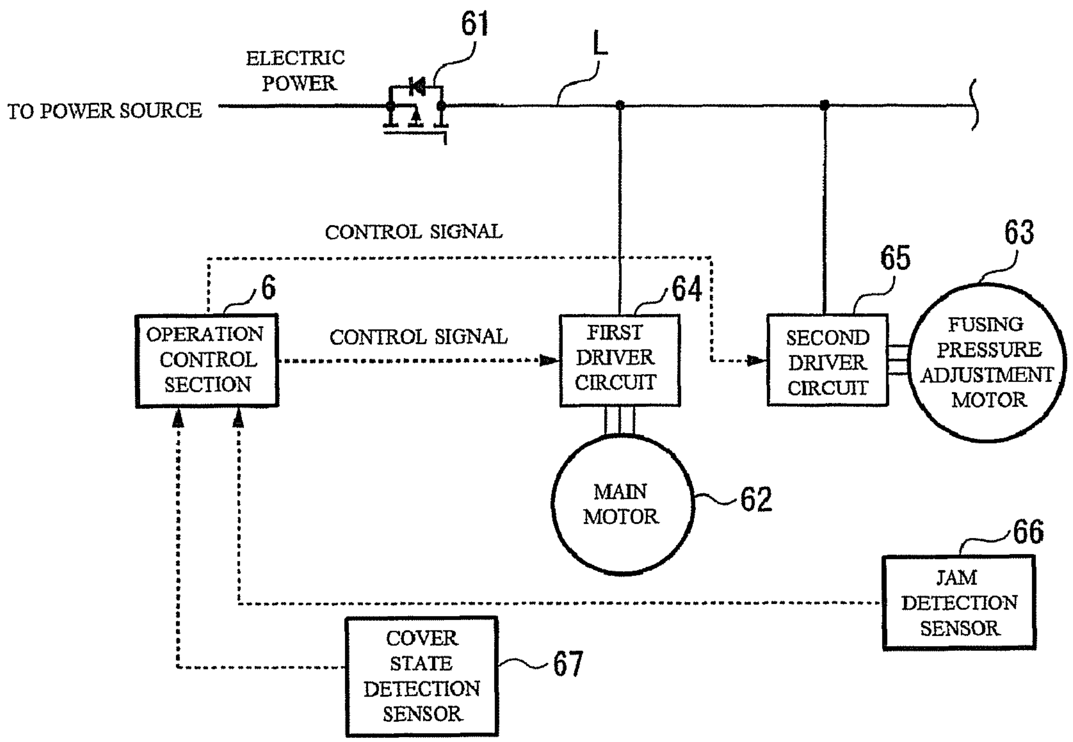
FIG. 3 is a diagram showing interconnection among a electronic switch 61, a main motor 62, a fusing pressure adjustment motor 63, a first driver circuit 64, a second driver circuit 65, a jam detection sensor 66, a cover state detection sensor 67, and an operation control section 6 according to one embodiment of the present disclosure.
Figure 4:
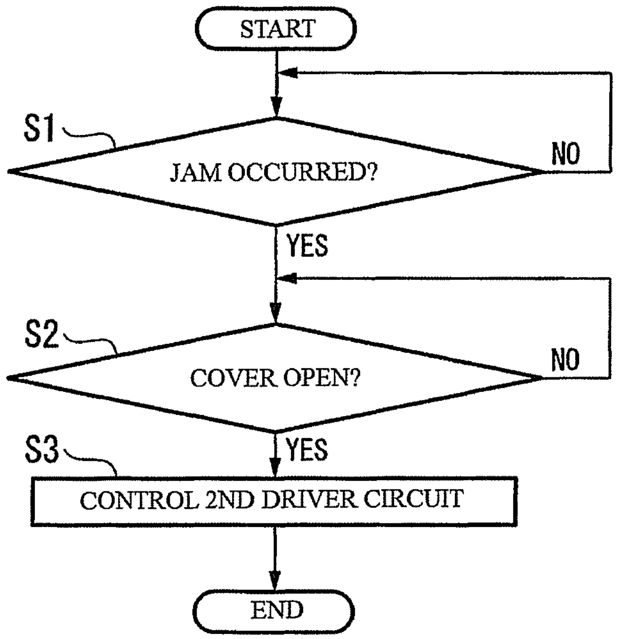
FIG. 4 is a flow chart showing operation of a multifunction peripheral A according to one embodiment of the present disclosure.

As shown in FIG. 3, in addition to the components mentioned above, the image formation section 4 is further provided with an electronic switch 61, a main motor (first motor) 62, a fusing pressure adjustment motor (second motor) 63, a first driver circuit 64, a second driver circuit 65, a jam detection sensor 66, and a cover state detection sensor 67.

The electronic switch 61 is a switch that switches the supply of electric power to the entire image formation section 4 according to a control signal fed from the operation control section 6. For example, when a cabinet cover 40 provided on the front side of the multifunction peripheral A is in a closed state, the electronic switch 61 is in an on state to supply electric power to the image formation section 4; when the cabinet cover 40 is in an open state, the electronic switch 61 is in an off state to stop the supply of electric power to the image formation section 4.

The electronic switch 61 is, for example, an FET (field-effect transistor) of which a gate terminal is connected to the operation control section 6. When a control signal having a high-level voltage is fed from the operation control section 6 to the gate terminal, the electronic switch 61 is in an on state; when a control signal having a low-level voltage is fed from the operation control section 6 to the gate terminal, the electronic switch 61 is in an off state. The electronic switch 61 may instead be a bipolar transistor or an IGBT (insulated-gate bipolar transistor).

The main motor 62 is a motor for rotating the rollers provided in the above described image formation section 4, namely the belt rollers 41 (driving roller 41*a*, driven roller 41*b*, and tension roller 41*c*), the primary transfer rollers 44Y, 44C, 44M, and 44K, the pickup roller 46, the transfer rollers 47, the registration rollers 48, the secondary transfer roller 49, the fusing rollers 51, the discharge rollers 52, the reversing rollers 54, and the three pairs of reversed paper transfer rollers 56. The main motor 62 is coupled to these rollers via gear mechanisms, and feeds the rollers with rotating forces via the gear mechanisms.

The fusing pressure adjustment motor 63 is a motor for driving an actuator (unillustrated) for moving the pressing roller 51*b* to adjust the fusing pressure (nip pressure) between the heating roller 51*a* and the pressing roller 51*b* in the fusing rollers 51. The fusing pressure adjustment motor 63 is coupled to the actuator via a gear mechanism, and drives the actuator via the gear mechanism. Moreover, as shown in FIG. 3, the fusing pressure adjustment motor 63 is supplied with electric power from the same power line L as the main motor 62.

The main motor 62 and the fusing pressure adjustment motor 63 are, for example, each a permanent-magnet synchronous motor composed of a rotor, which houses a permanent magnet inside, and a stator, which is arranged opposite the circumferential face of the rotor and is provided with a coil. These motors rotate by being fed with three-phase (U-, V-, and W-phase) driving electric power.

The first driver circuit 64 is an inverter provided with a plurality of switching devices for driving the main motor 62 to rotate. By switching those switching devices according to a control signal fed from the operation control section 6, the first driver circuit 64 generates driving electric power for driving the main motor 62 and feeds it to the main motor 62. Based on electric power from the power line L (see FIG. 3), the first driver circuit 64 generates the driving electric power and feeds it to the main motor 62.

The second driver circuit 65 is an inverter provided with a plurality of switching devices for driving the fusing pressure adjustment motor 63 to rotate. By switching those switching devices according to a control signal fed from the operation control section 6, the second driver circuit 65 generates driving electric power for driving the fusing pressure adjustment motor 63 and feeds it to the fusing pressure adjustment motor 63. Like the first driver circuit 64, based on electric power from the power line L (see FIG. 3), the second driver circuit 65 generates the driving electric power and feeds it to the fusing pressure adjustment motor 63.

The first driver circuit 64 and the second driver circuit 65 described above are, for example, each composed of three pairs of legs each having two switching devices connected in series. The switching devices are, for example, FETs, and their gate terminals are connected to the operation control section 6. The switching devices may be, instead of FETs, for example, bipolar transistors or IGBTs. The switching devices each have a reverse parallel diode connected in parallel.

The jam detection sensor 66 detects a jam (clogging with paper) during transport of recording paper R in the image formation section 4, and feeds a jam detection signal indicating the result of the detection to the operation control section 6.

The cover state detection sensor 67 detects the state, whether open or closed, of the cabinet cover 40, provided on the front side of the multifunction peripheral A, of the image formation section 4, and feeds a state detection signal indicating the state of the cabinet cover 40 to the operation control section 6.

The communication section 5 conducts, according to a control signal fed from the operation control section 6, communication with an external multifunction peripheral or facsimile machine via a telephone network, or with a client computer or the like via a LAN (local area network). That is, the communication section 5 is equipped for both communication complying with a LAN standard such as Ethernet (a registered trademark) and communication complying with a G3 or other facsimile standard.

The operation control section 6 is composed of, among others, a CPU (central processing unit), ROM (read-only memory), RAM (random-access memory), and an interface circuit for exchange of various signals among electrically interconnected different parts. Based on various operation control programs stored in the ROM, the operation control section 6 performs various operations and conducts communication with different parts in order to control the entire multifunction peripheral A. As will be described in detail later, when a jam of recording paper R and an open state of the cabinet cover 40 are detected in the image formation section 4, and then the user removes the jam of recording paper R, the roller at the site of the jam of recording paper R is rotated, and this causes the main motor 62 to rotate and generate an electromotive force. To consume this electromotive force, the operation control section 6 controls the second driver circuit 65.

Next, the operation of the multifunction peripheral A having an image forming system configured as described above will be described.

First, the overall operation of the multifunction peripheral A will be described. For example, when the user sets a document on the ADF 20 and operates the operation/display section 1 to enter a command to duplicate (copy) the document on one side of recording paper R, a command signal corresponding to the command is fed from the operation/display section 1 to the operation control section 6. In response, the operation control section 6 makes the image reading section 2 read document images of the document sequentially page by page, and makes the image data storage section 3 store document image data of those document images. The operation control section 6 then generates bit-map image data for toner of each color based on the document image data, and makes the image formation section 4 perform image formation to reproduce the document images based on the bit-map image data.

Specifically, the operation control section 6 drives the pickup roller 46 to make it pick up the recording paper R inside the paper feed cassette 45 one sheet after another to feed it to the transfer rollers 47, and drives the transfer rollers 47 to make it transport the recording paper R toward the registration rollers 48. Moreover, the operation control section 6 drives the driving roller 41*a* to set the intermediary transfer belt 42 in motion, and drives the image forming units 43Y, 43C, 43M, and 43K to make them form toner images of different colors, formed of positive-charge toner of those colors, on the photosensitive surfaces (circumferential surfaces) of the photosensitive drums ay, ac, am, and ak based on the respective bit-map image data. Then, the operation control section 6 causes a negative primary bias to be applied to the primary transfer rollers 44Y, 44C, 44M, and 44K, and thereby causes the toner images on the photosensitive drums ay, ac, am, and ak to be primarily transferred to the intermediary transfer belt 42.

The operation control section 6 then drives the registration rollers 48 in accordance with the timing of image formation for the different colors in the image forming units 43Y, 43C, 43M, and 43K, and causes a negative secondary bias to be applied to the secondary transfer roller 49 to cause the toner images (document images) on the intermediary transfer belt 42 to be secondarily transferred to a desired position on the recording paper R. The operation control section 6 then, while making the separator-destaticiser 50 destaticize the recording paper R by use of a positive destaticizing bias, drives the fusing rollers 51 and makes the branch guide 55 switch to the first position (the position indicated by broken lines in the figure) to make it transport the recording paper R toward the discharge rollers 52. Then, the operation control section 6 drives the discharge rollers 52 to make it discharge the recording paper R onto the discharged paper tray 53.

On the other hand, in a case where the user enters a command to duplicate (copy) the document on both sides of recording paper R, the operation control section 6 operates in the same manner as described above until it drives the fusing rollers 51, and thereafter operates differently. Specifically, the operation control section 6 then drives the fusing rollers 51 and makes the branch guide 55 switch to the second position (the position indicated by solid lines in the figure) to make it transport the recording paper R toward the reversing rollers 54. After making the reversing rollers 54 rotate in the forward direction for a predetermined length of time, the operation control section 6 makes the branch guide 55 switch to the first position and makes the reversing rollers 54 rotate in the reverse direction to make it transport the recording paper R toward the reversed paper transfer rollers 56. The operation control section 6 then drives the reversed paper transfer rollers 56 to make it transport the recording paper R toward the registration rollers 48.

Moreover, the operation control section 6 causes toner images formed of positive-charge toner of different colors to be formed on the photosensitive surfaces of the photosensitive drums ay, ac, am, and ak. The operation control section 6 then causes a negative primary bias to be applied to the primary transfer rollers 44Y, 44C, 44M, and 44K, and thereby causes the toner images on the photosensitive drums ay, ac, am, and ak to be transferred to the intermediary transfer belt 42.

The operation control section 6 then drives the registration rollers 48 in accordance with the timing of image formation for the different colors in the image forming units 43Y, 43C, 43M, and 43K, and causes a negative secondary bias to be applied to the secondary transfer roller 49 to cause the toner images on the intermediary transfer belt 42 to be transferred to a desired position on the reverse side of the recording paper R. The operation control section 6 then, while feeding the recording paper R and making the separator-destaticiser 50 destaticize the recording paper R by use of a positive destaticizing bias, drives the fusing rollers 51 and makes the branch guide 55 switch to the first position to make it transport the recording paper R toward the discharge rollers 52. Then, the operation control section 6 drives the discharge rollers 52 to make it discharge the recording paper R onto the discharged paper tray 53.

Here, if a jam of recording paper R occurs in the image formation section 4, the operation control section 6 operates in a distinctive manner as described below. First, the operation control section 6 checks whether or not a jam of recording paper R has occurred in the image formation section 4 based on a jam detection signal fed from the jam detection sensor 66 (step S1).

So long as no jam of recording paper R has occurred in the image formation section 4 (if "NO" at step S1), the operation control section 6 repeats the check at step S1 described above. By contrast, if a jam of recording paper R has occurred in the image formation section 4 (if "YES" at step S1), the operation control section 6 checks whether or not the cabinet cover 40 of the image formation section 4 is in an open state based on a state detection signal fed from the cover state detection sensor 67 (step S2).

That is, the operation control section 6 checks whether or not the user has opened the cabinet cover 40 of the image formation section 4 to remove the jam of recording paper R in the image formation section 4. So long as the cabinet cover 40 of the image formation section 4 is not in an open state but in a closed state (if "NO" at step S2), the operation control section 6 repeats the check at step S2 described above. By contrast, if the cabinet cover 40 of the image formation section 4 is in an open state (if "YES" at step S2), the operation control section 6 controls the second driver circuit 65 to make it possible to supply driving electric power from the power line L to the fusing pressure adjustment motor 63 (step S3).

That is, the operation control section 6 controls the second driver circuit 65 so that the switching devices in the second driver circuit 65 are so switched as to generate driving electric power for driving the fusing pressure adjustment motor 63. Here, the operation control section 6 controls the second driver circuit 65 such that the fusing pressure adjustment motor 63 rotates in a prescribed direction. For example, the operation control section 6 specifies such a rotation direction of the fusing pressure adjustment motor 63 as to cause the pressing roller 51*b* to be moved away from the heating roller 51*a* by the actuator (unillustrated), and then makes the second driver circuit 65 perform its switching. Meanwhile, the operation control section 6 keeps the electronic switch 61 in an off state.

Thus, when a jam of recording paper R in the image formation section 4 is removed by the user, even when the roller at the site of the jam of recording paper R is rotated and this causes the main motor 62 to rotate and generate an electromotive force, the electromotive force is supplied via the power line L to the second driver circuit 65. The second driver circuit 65 then generates driving electric power, and this driving electric power is consumed by the fusing pressure adjustment motor 63.

As described above, according to the embodiment described above, when a jam of recording paper R and an open state of the cabinet cover 40 are detected, the second driver circuit 65 is so controlled that driving electric power can be supplied from the power line L, to which both the fusing pressure adjustment motor 63 and the main motor 62 are connected, to the fusing pressure adjustment motor 63 so that, during removal of the jam of recording paper R, even when the roller at the site of the jam of recording paper R is rotated, the electromotive force generated by the main motor 62 being rotated is consumed by the fusing pressure adjustment motor 63. Thus, it is possible to consume and suppress the electric power generated in the main motor 62 without adding an extra component.

The embodiment of the present disclosure specifically described above is not meant to limit the present disclosure in any way. For example, possible modifications include the following. In the embodiment described above, the second motor (fusing pressure adjustment motor 63) is for generating a rotating force needed to adjust the fusing pressure of the fusing roller. This, however, is not meant as any limitation. For example, the second motor may instead be one for rotating rollers different from those rotated by the first motor (main motor 62), or for generating a rotating force for rotating a fan.

In a case where, instead of a single main motor 62 as described above, a plurality of motors are provided to rotate the rollers for the transport of recording paper R and are connected to the same power line L, when a jam of recording paper R in the image formation section 4 is removed by the user, it is not possible to identify which of the motors rotates and generates an electromotive force. Accordingly, on detecting a jam of recording paper R and an open state of the cabinet cover, the operation control section 6 can bring the driver circuits provided for those motors into a state in which they can supply driving electric power so that, irrespective of which motor rotates and generates an electromotive force, the electric power is consumed by the other motors.

What is claimed is:

1. An image forming apparatus comprising:

a first motor for rotating a roller for transporting recording paper;

a second motor for generating a rotating force for rotating a roller, different from the roller rotated by the first motor, for adjusting a fusing pressure of a fusing roller, the second motor being supplied with electric power from a same power line as the first motor;

a driver circuit connected to the power line, the driver circuit generating driving electric power based on electric power from the power line to supply the driving electric power to the second motor; and a controller for controlling, on detecting a jam of the recording paper and an open state of a cabinet cover, the driver circuit such that driving electric power is supplied from the power line to the second motor.

2. The image forming apparatus according to claim 1, further comprising a switch for stopping supply of electric power from a power source to the power line on detecting the open state of the cabinet cover.

* * * * *